Patented Mar. 18, 1947

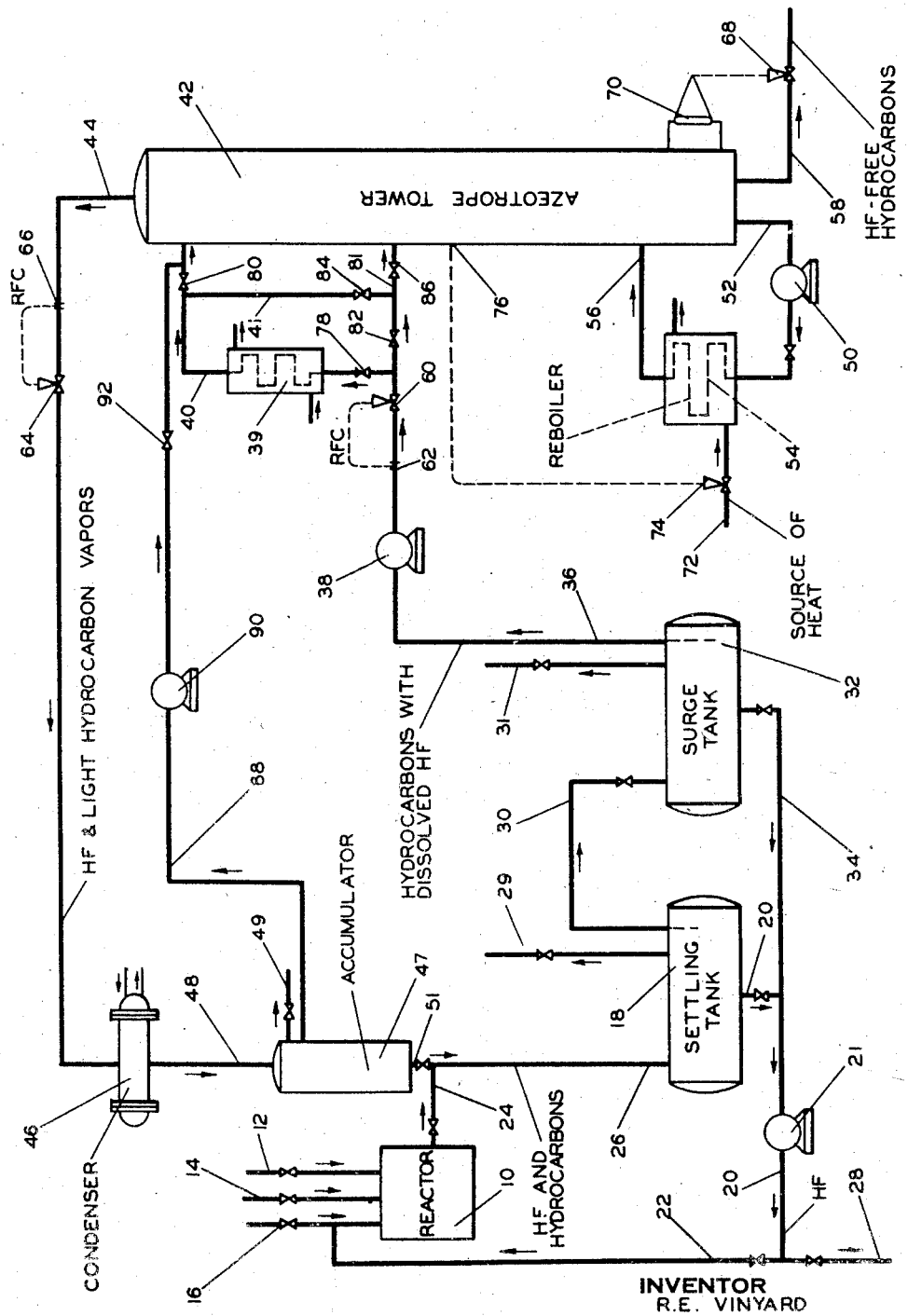

2,417,669

UNITED STATES PATENT OFFICE 2,417,669

DISTILLATION OF HYDROGEN FLUORIDE-HYDROCARBON MIXTURES AT CONSTANT RATE

Roy E. Vinyard, Phillips, Tex., assignor to Phillips Petroleum Company, a corporation of Delaware Application January 1, 1944, Serial No. 516,670

12 Claims. (Cl. 202—40)

This invention relates to the distillation of mixtures of hydrogen fluoride and hydrocarbons. In a specific embodiment the invention relates to the recovery of hydrogen fluoride from admixture with hydrocarbon material containing low-boilin paraffin hydrocarbons. The invention in a specific modification relates to the operation of an azeotropic fractionation wherein a low-boiling paraffin-hydrogen fluoride azeotrope is recovered overhead with the production of a hydrogen fluoride-free bottom product.

Hydrogen fluoride has recently come into prominence as a very important catalyst for numerous organic reactions. For example, it is used as a catalyst in the conversion of hydrocarbons by alkylation, isomerization, reconstruction, cracking, cyclization, and/or aromatization. It is also used as a reactant in the production of alkyl fluorides. Liquid hydrogen fluoride has also been found useful as a refining agent or selective solvent in the removal of certain impurities from saturated hydrocarbons.

Perhaps the most important industrial process at the present time involving the use of hydrogen fluoride is the alkylation of low-boiling paraffinic hydrocarbons, particularly isobutane, with alkylating agents, particularly olefins such as propylene and butylenes, to form normally liquid high octane number paraffins suitable for use in aviation fuels. In such alkylation processes the reactants are intimately contracted in liquid phase with liquid concentrated hydrofluoric acid, and reaction effluents are passed to a settling zone wherein a liquid hydrocarbon phase and a liquid acid phase are separated. The acid phase is largely recycled to the reaction and a portion thereof may be subjected to purification, as by distillation for the removal of water and acid-soluble oils, before being re-introduced as a catalyst into the process. The hydrocarbon phase is ordinarily introduced at an intermediate point into a fractionating tower provided with kettle heating and reflux cooling, from which tower an overhead fraction is recovered comprising all the hydrogen fluoride together with at least sufficient light hydrocarbons to form azeotropes therewith. Inasmuch as a large excess of the low-boiling paraffin reactant, such as isobutane, is maintained in the alkylation reaction mixture, and some propane is usually also present, there is adequate light hydrocarbon in the feed to the azeotrope tower to allow complete separation of hydrogen fluoride overhead. The overhead product may be subjected to separate cooling and condensation and passed to a separate settling zone for separation of acid phase and hydrocarbon phase. The acid phase is returned to the reaction, while the hydrocarbon phase is pumped to the top of the azeotrope tower to provide reflux. A large volume of light hydrocarbons must thus be continually condensed and revaporized to provide sufficient cooling. The reflux accumulator and pump required for this operation are of course subject to corrosion by the acid.

In the operations just described it is necessary to provide a substantial amount of cooling in the top of the fractionator for the production of reflux. This is done either by internal cooling coils within the fractionator, which are subject to well-known limitations and objections, or by external condensation of a portion of the overhead product and pumping resulting condensate to the top of the fractionator as in the method described, which is ordinarily preferred. Sufficient cooling must be provided to remove a substantial portion of the heat imparted to the system by the reboiler at the bottom of the column. Such reboiling and refluxing operations are now well known to the art. Furthermore, the fractionator is operated at a relatively high pressure due to the low-boiling nature of the overhead product.

In the copending application of Lucien H. Vautrain, Serial No. 516,672, filed January 1, 1944, is disclosed an improved manner of carrying out fractionations of the nature described, in which the complete recovery of hydrogen fluoride overhead is possible without the necessity of providing the conventional reflux, while still producing the desired HF-free bottom product. In this improved manner of operating the azeotropic distillation, as disclosed by Vautrain, the cooling ordinarily provided in the top of the azeotrope tower may be entirely dispensed with. Nor is it necessary to provide an arrangement for separate condensation and recovery of overhead product for re-use as refluxing medium. In addition to the saving in equipment, which is an important item at the present time, the amount of equipment in contact with acid, and hence subject to corrosion, is reduced. A given fractionator is also enabled to handle a larger load, that is produce more bottom product of a given purity. The improved operation is obtained in a very simple manner by introducing the liquid hydrocarbon phase, from which acid has been settled but which still contains dissolved acid, as feed to the fractionator at the top of the fractionator rather than at an intermediate point as has previously been practiced, coupled with removing overhead vapors and returning the same to a point in the system ahead of the fractionator, preferably to the acid settler. This liquid feed is normally obtainable at substantially atmospheric temperatures, and since the fractionator is readily and usually operated at elevated temperatures, the feed itself provides all the cooling that is necessary within the fractionator. Even when the feed is at somewhat elevated temperatures, the fractionator is easily operated at sufficiently higher temperatures that the feed acts as reflux. In some cases in fact, the feed is heated somewhat before introduction into the fractionator. It will accordingly be seen that the liquid feed containing dissolved hydrogen fluoride as well as low-boiling unreacted hydrocarbons and higher-boiling alkylate acts as refluxing medium for the azeotrope tower. The overhead vapors carrying the hydrogen fluoride are condensed and returned to the acid settler together with the reactor effluents, rather than to a separate settler as heretofore, so that carrying over of heavier hydrocarbons, which occurs to a limited extent in this method of operating, introduces no problems, for these heavier hydrocarbons are merely returned again to the fractionator. Such an operation as this is impossible in ordinary fractionational distillations because of contamination of overhead product with part of the material normally removed as bottom product. The previous methods of carrying out this azeotropic distillation avoided such carryover, but such a pure product is not required when passing same to the primary settler, and hence represents a needless burdening of the fractionation system. In effect the improvement referred to establishes an internal circuit through which a certain amount of light hydrocarbons and smaller amounts of heavier hydrocarbons continuously circulate, this circuit comprising the settler, top of the "azeo" tower, condenser, and back to the settler. Acid dissolved in the hydrocarbon phase passes once through this circuit and upon returning to the settler in the overhead condensate does not redissolve in the hydrocarbon phase, which is already saturated with HF, but settles out and is recovered with the acid phase. The total hydrocarbon portion of the reactor effluent, except that small part which is dissolved in the acid phase, passes into the fractionator and out as kettle product. The net effect is that the hydrocarbon phase from the acid settler is stripped only of dissolved HF. By this operation not only are considerable equipment and cooling costs avoided, but a smoother operation of the fractionator is obtained. This is due in part to the fact that only one stream need be controlled as it enters the fractionator. By operating the fractionator in this manner as a stripper, the capacity of the fractionator is increased, and it may be operated at a lower pressure, or at higher temperatures, which in any case allows greater throughput.

While the method of Vautrain just described is an improvement over previous methods of carrying out the azeotropic distillation, certain difficulties which were common to the prior methods are still encountered upon occasion in operating in the new manner in which feed is passed to the top of the tower and overhead product is passed to the acid settler. These difficulties arise from the circumstance that the composition of the feed to the "azeo" tower is variable. Such variation in composition may be due to variations in the operation of the reactors, such as temperature changes which are reflected in changed amounts of HF dissolved in the liquid hydrocarbon phase. The amount of isobutane and/or olefinic feed stock to the reactors is dependent on other refinery operations, and hence may vary over a wide range. The propane and lighter content of the feed stock is dependent on operation of different fractionators. Trouble in the deisobutanizer columns may change the amount of recycle isobutane available. In the operation of the azeotropic fractionator it has been customary to control the heat input to the reboiler to maintain a constant bottom temperature. The purpose of this was to control the composition of the kettle product and ensure its freedom from hydrogen fluoride. The tower pressure and rate of overhead take-off were allowed to vary. However, when the composition of the hydrocarbon phase passed to the tower changed, particularly when the content of light gases increased, the take-off rate and pressure would change. With excess light gases, the pressure had a tendency to build up too high a value. Inasmuch as in any of the methods described for providing reflux, light hydrocarbons from the overhead product were in effect recycled to the fractionator, such light gases would pyramid in the system. While a portion found their way out by solution in the kettle product, it was sometimes necessary to vent an appreciable amount from one of the accumulators or surge tanks to get the fractionation system lined out properly again. When an excessive amount of light gases accumulated, they would sometimes force hydrogen fluoride out in the kettle product. As stated, this problem occurs not only with the older methods of operating, but even sometimes with the new method of the aforementioned Serial No. 516,672.

It is an object of this invention to provide an improved process for the distillation of hydrogen fluoride-containing mixtures. Another object is to recover hydrogen fluoride from admixture with hydrocarbons. A further object is to improve the operation of a fractionation system in which a minimum-boiling azeotropic mixture of hydrogen fluoride with low-boiling paraffinic hydrocarbon material is produced in an overhead product. Another object is to recover a hydrocarbon fraction substantially free of hydrogen fluoride from a mixture containing low-boiling hydrocarbons and hydrogen fluoride. A further object is to provide an improved method of automatically controlling the operation of a fractionator wherein hydrogen fluoride is stripped from admixture with hydrocarbons, said method allowing the production of a hydrogen fluoride-free bottom product from a fractionator feed subject to variation in composition. A further object is to provide an improved method for recovering hydrogen fluoride catalyst for re-use in a reaction zone, and to recover hydrocarbon material free from hydrogen fluoride, in a process for the conversion of hydrocarbons, particularly in an alkylation process. Other objects and advantages of the invention will be apparent, to one skilled in the art, from the accompanying disclosure and description.

Briefly stated, my invention in preferred embodiment resides in operating an azeotropic fractionation of the nature described, in the following manner. The feed is passed to the fractionator at a constant flow rate. Vapors are taken off overhead at a constant flow rate sufficient to ensure that with any likely composition of feed all the HF dissolved in the feed will be obtained in this overhead product. The heat supplied to the reboiler of the fractionator is controlled in response to the pressure on the fractionator so that the latter is operated at a constant pressure. Preferably the bottom product is removed at a controlled rate to maintain a constant liquid level in the bottom of the fractionator. The smoothest operation is obtained if the feed is supplied at constant temperature. This apparently simple means of controlling the azeotropic fractionator has been found to obviate the difficulties hereinbefore referred to, and the bottom product is free from hydrogen fluoride even when the liquid hydrocarbon phase fed from the acid settler to the fractionator undergoes wide variation in composition. By the combination of constant feed rate, constant overhead take-off, and variable kettle temperature controlled to give constant column pressure, the troublesome pressure build-up formerly occurring when operating with a constant kettle temperature no longer is encountered. I have stated that my method of control is applicable to the distillation regardless of the method of refluxing used. However, it is particularly advantageous when used in conjunction with the passage of feed to the top of the fractionator and return of condensed overhead vapors to the acid settler. A practically trouble-free operation is obtained when operating in this manner controlled as specified, and higher throughputs, less heat load, and less equipment are required than when the feed is passed to a mid-point and overhead is condensed and separately separated, with return of the hydrocarbon layer as reflux, or when internal cooling coils provide the reflux.

The invention may perhaps be more adequately understood by reference to the accompanying drawing and description thereof. The drawing represents somewhat diagrammatically one preferred arrangement of apparatus elements, and flow of materials therethrough, in which the process of the invention may be practiced. While the elements essential to an understanding of the invention are shown in the drawing it will be appreciated that various auxiliary pieces of equipment may be provided by one skilled in the art. It will also be appreciated that various modifications may be made without departing from the spirit and scope of the invention.

In the drawing a reaction zone is represented diagrammatically by the rectangle 10. In a preferred operation this reactor is used in carrying out the alkylation of a low-boiling paraffin, preferably isobutane, with one or more low-boiling olefins, such as a mixture of butenes. The isoparaffin may be introduced by line 12 while the olefin is introduced by line 14. Make-up liquid hydrogen fluoride catalyst is introduced through line 16. The bulk of the catalyst is recycled to the reactor from the bottom of settling tank 18 via lines 20 and 22. In some cases it is desirable to incorporate a minor amount of boron fluoride with the liquid hydrogen fluoride as disclosed in the co-pending application of Frey, Serial No 467,954.

Methods of effecting the desired alkylation reaction will not be described here in detail inasmuch as they form no part of the present invention and are known to the art. Such methods are disclosed, for example, in U. S. Patent 2,322,800 of Frederick E. Frey, Frey's application Serial No. 424,204 and the aforesaid application of Frey, Serial No. 467,954. While an alkylation reaction is disclosed specifically in describing the invention, it is to be understood that reactions other than alkylation may be carried out in reactor 10. For example, the isomerization of saturated hydrocarbons in the presence of hydrogen fluoride as a catalyst may be carried out in reactor 10. Furthermore, a combination of HF-catalyzed alkylation and isomerization reactions may be effected in reactor 10 in one or more stages. It will be appreciated that my invention may be applied to effluents from any of such processes or others known to the art involving the conversion or treatment of hydrocarbon materials in which an effluent stream containing hydrogen fluoride and low-boiling hydrocarbons is obtained. The apparatus comprising reactor 10 may accordingly be varied to suit the particular process and will comprise one or more reaction zones and may in addition comprise much auxiliary apparatus which need not be shown or discussed here in detail.

Considering the case in which isobutane is alkylated with butylenes in reactor 10, liquid concentrated hydrofluoric acid and liquid hydrocarbon reactants under pressure are agitated together to produce a temporary emulsion of hydrocarbon and acid phases and give ready access of isobutane to the acid phase wherein most of the reaction takes place. The emulsion is vigorously circulated to distribute the olefin reactant in low concentration and thus discourage polymerization and permit a maximum of alkylation. A several-fold molar excess at least of isobutane over olefin is maintained to minimize realkylation of primary alkylate. Normal paraffins act as diluents and impede access of isobutane to the catalyst and are preferably kept at low concentration. Actually, due to the impracticability of preparing absolutely pure feed stocks and possibly due also to side reactions, some normal butane and some propane are ordinarily present, along with traces of lighter gases. A reaction temperature of 75 to 115° F. gives good results and can be maintained by water cooling to take up exothermic heat of reaction; refrigeration is not necessary. Reaction time is less than one hour, and ordinarily 10 to 15 minutes is adequate. With continued use the acid acquires acid-soluble organic contaminants which are removed by distillation; the titratable acidity of the catalyst phase is usually maintained at 85 to 90 per cent.

Effluents from the reaction zone 10 contain unconverted low-boiling hydrocarbons including propane and a large excess of isobutane, together with higher-boiling paraffinic hydrocarbon produced by alkylation reaction, and hydrogen fluoride catalyst. Such effluents are continuously withdrawn via lines 24 and 26 and passed to settling tank 18 wherein a phase separation is readily obtained. In case the conversion carried out in reactor 10 is at a temperature above that allowing separation of the effluents into the liquid phases, suitable cooling means (not shown) may be provided in line 24 or line 26 to effect the desired phase separation and bring the mixture to the preferred temperature range. The acid phase is withdrawn from settler 18 via line 20 as heretofore mentioned and returned by pump 21 to the reactor. A portion of this acid is usually withdrawn via line 28 and passed to purification means not shown, after which it is reintroduced along with make-up acid through line 16. From settling tank 18 the upper (hydrocarbon) phase, which contains small amounts of hydrogen fluoride dissolved therein, is passed via line 30 into surge tank 32. Small amounts of undissolved acid may drop out in tank 32 and are recovered through line 34. Pop-off lines 29 and 31 are provided at the tops of tanks 18 and 32, respectively, for release of small amounts of light gases which may accumulate therein. In a typical operation the tanks are held under 100 and 60 pounds gage pressure, respectively. The liquid hydrocarbon phase containing dissolved HF is withdrawn through line 36 by means of pump 38 and passed via line 40 and/or line 41 into a high point of fractionator 42, preferably being introduced upon the top tray of the fractionator. This liquid feed is ordinarily obtained from surge tank 32 at substantially atmospheric temperature or only slightly above and need not be further cooled before being introduced into tower 42. In fact, in order to increase the capacity of the fractionator, the feed stream may be heated somewhat by heater 39. When the feed stream undergoes considerable variation in temperature, an improved operation is obtained by bringing the same to a constant temperature by means of heater 39. In the method of introduction just described, line 81 leading to an intermediate point of the column is not used, valve 86 being closed. Valve 92 is also usually closed so that the feed entering at the top of fractionator 42 is the sole reflux. Valve 80 is open, and if heater 39 is not used valve 78 is closed and valves 82 and 84 are open. Or these valves may be partly or completely closed and valve 78 partly or completely opened to allow partial or complete flow of feed through heater 39. In case an operation is carried out in which separate reflux is desired with introduction of feed at a lower point, valve 80 may be closed and the feed may enter the column through line 81 and valve 86; by control of valves 82, 78 and 84, part or all of the feed may pass through heater 39 as desired. Regardless of the particular course taken by the feed, the total flow of feed from tank 32 through line 36 and pump 38 is maintained constant by a rate-of-flow controller comprising a motor valve 60 actuated in response to orifice plate 62.

In azeotrope tower 42 a continuous fractionation is carried out whereby all of the dissolved hydrogen fluoride is stripped from the feed and withdrawn in the overhead product via line 44, along with at least sufficient propane, isobutane, and/or other light hydrocarbons to form an azeotropic mixture therewith. Propane and lighter gases may comprise a substantial proportion of the light hydrocarbon material taken off in line 44, the remainder being isobutane and heavier, including some vaporized alkylate when the feed enters at the top of the column. A rate-of-flow controller comprising motor valve 64 and orifice plate 66 is set to maintain a constant rate of flow of overhead vapors through line 44. In a typical instance this flow is set at about 10 per cent of the feed flow rate, which is more than adequate in the particular case to allow the removal of all amounts of hydrogen fluoride apt to be encountered under various operating conditions of the plant along with at least sufficient light hydrocarbons to form the minimum-boiling azeotrope. The low-boiling fraction is line 44 is passed to condenser 46 and the condensate passed therefrom via line 48 to accumulator 47. Uncondensed gases may in some cases be periodically or continuously withdrawn through line 49. Pressure in accumulator 47 is normally held at about 120–160 pounds, or a little lower than the fractionator pressure. Liquid passes via line 51 to settling tank 18 in admixture with the reactor effluents, or may be passed to tank 32 if desired. Line 88 controlled by valve 82, and pump 90 may be be provided for passing hydrocarbon phase from accumulator 47 to the top of column 42 as reflux. However, as mentioned before, this operation is preferably avoided by passing the total overhead condensate back to the settling tank, and introducing the fractionator feed at the top of column 42.

Liquid is taken by pump 50 from the bottom of fractionator 42 through line 52 and passed through reboiler 54 and line 56 back into the kettle. Reboiler 54 may comprise internal heating coils in column 42, but preferably is an externally heated means as shown, which may be heated with steam or by heat exchange with hot oil or the like, or which may be externally fired, which latter is ordinarily preferable since leakage of water into the system is thereby precluded. The source of heat, whatever it may be, passes through means 72 controlled by motor valve 74. This valve is controlled by control line 76 in response to the pressure at a point in the fractionator 42. The control is set so that a constant desired pressure is maintained on the column. Preferably this pressure is sufficiently high to allow flow of overhead product through the system to the settling tanks without the necessity of further pumping or compressing the same. In a typical installation a constant pressure within the range of 160–180 pounds per square inch gage is established for column 42. If an increased amount of light hydrocarbon should enter the fractionation system from the reactors there would be a tendency for the column pressure to increase. Instead of allowing this pressure increase and/or increasing the overhead take-off rate, the heat input to the reboiler is automatically decreased. This allows the increased content of light hydrocarbon to remain in the liquid phase and be removed in the kettle product.

A liquid level control 70 is preferably provided for controlling valve 68 in line 58, through which a kettle product essentially free from hydrogen fluoride is withdrawn. This product comprises the normally liquid alkylate as well as inert hydrocarbons and excess isobutane, and corresponds essentially to the hydrocarbon content of the reactor effluents except for that dissolved in the acid phase in settler 18. The HF-free kettle product is passed to further fractionation means (not shown) for the recovery and recycle of isobutane through line 16, and recovery of the desired alkylate. Ordinarily this kettle product is subjected to a defluorination treatment prior to such fractionation.

As an example of the conditions used in the actual operation of an alkylation plant in accordance with my invention, the following data are presented. It will be appreciated that these data are merely illustrative of a single set of conditions, and are accordingly not to be construed as unduly limiting the invention, which may be applied to a system operating within a wide range of conditions which will be readily apparent to one skilled in the art.

A combined hydrocarbon feed, including fresh isobutane and butenes plus recycled isobutane, is passed into the reactors at 75° F. at a rate which may range from say 600 to 900 barrels per hour, but which in the particular instance reported herein was 732 barrels per hour. The temperature of the feed sometimes rises to as high as about 100° F. in this plant. A 1:1 volume ratio of hydrocarbon to acid is used, so that 732 barrels per hour of recycle, regenerated, and make-up concentrated hydrofluoric acid is passed to the reactors at 80° F. Total effluent from the reactors passes to settler 18 at 80° F. Hydrocarbon liquid is pumped at a controlled constant flow rate of 820 barrels per hour from tank 32 through lines 36 and 40 to the top tray of fractionator 42, being heated in unit 39 to 120° F. Column 42 contains 20 trays, and is 7 feet in diameter. Overhead vapors are taken off at a controlled constant flow rate of 82 barrels per hour (condensed), and usually comprise about 12 barrels per hour of hydrogen fluoride. The overhead product thus comprises about 10 per cent of the fractionator feed, and allows a considerable leeway in handling any increased amounts of HF which might be encountered. The temperature of the overhead vapors measured 147° F. at the time these data were obtained. The column pressure is set at 164 pounds per square inch gage, and the kettle temperature, which varies somewhat in maintaining this pressure constant, measured 183° F. Kettle product in the amount of 740 barrels per hour is produced, and is free of HF.

I claim:

1. In the fractional distillation of a mixture containing low-boiling hydrocarbons and hydrogen fluoride, the improvement which comprises passing such a mixture to a high point in a fractionating means at constant flow rate as feed and reflux, separating from said fractionating means at a positively controlled constant flow rate a vaporous overhead product comprising essentially all said hydrogen fluoride together with at least sufficient low-boiling hydrocarbon material to form a minimum-boiling azeotropic mixture with said hydrogen fluoride, withdrawing as bottom product from said fractionating means a higher-boiling hydrocarbon fraction essentially free of hydrogen fluoride at a rate controlled to maintain a constant liquid level in the bottom of said fractionating means, supplying heat to the bottom of said fractionating means, and controlling the amount of said heat to maintain constant pressure at a point in said fractionating means.

2. In the fractional distillation of a mixture containing low-boiling hydrocarbons and hydrogen fluoride, the improvement which comprises passing such a mixture to a fractionating means at constant flow rate, separating from said fractionating means at a positively controlled constant flow rate an overhead product comprising essentially all said hydrogen fluoride together with at least sufficient low-boiling hydrocarbon material to form a minimum-boiling azeotropic mixture with said hydrogen fluoride, withdrawing as bottom product from said fractionating means a higher-boiling hydrocarbon fraction essentially free of hydrogen fluoride, suppying reflux to said fractionating means, supplying heat to the bottom of said fractionating means, and controlling the amount of said heat to maintain constant pressure at a point in said fractionating means.

3. In the process of claim 2, cooling and condensing said overhead product to form a hydrogen fluoride phase and a hydrocarbon phase, recovering said hydrogen fluoride phase, and returning said hydrocarbon phase to said fractionating means.

4. In the continuous fractionation of a mixture containing low-boiling hydrocarbons and hydrogen fluoride in which the composition of said mixture is subject to variation, the improvement which comprises subjecting such a mixture to conditions forming a liquid hydrogen fluoride phase and a liquid hydrocarbon phase, separating said liquid hydrogen fluoride phase, passing said liquid hydrocarbon phase at a constant rate into a high point in a fractional distillation zone at a temperature sufficiently low that said liquid phase acts as reflux in said zone, separating from said fractional distillation a low-boiling vaporous fraction containing a low-boiling paraffin hydrocarbon and hydrogen fluoride at a constant rate adequate to remove substantially all said hydrogen fluoride therein, cooling and condensing said low-boiling fraction and combining with said mixture, supplying heat to a low point in said fractional distillation zone at a rate to maintain constant pressure at a point in said zone, and separating also from said fractional distillation a higher-boiling hydrocarbon fraction essentially free of hydrogen fluoride and containing low-boiling paraffin hydrocarbons substantially corresponding in quantity to that present in said mixture less that dissolved in said liquid hydrogen fluoride phase separated therefrom.

5. The process of claim 4, wherein said liquid hydrocarbon phase is passed to said fractional distillation means at a constant temperature.

6. In the fractional distillation of a mixture containing a low-boiling hydrocarbon and hydrogen fluoride, the improvement which comprises passing such a mixture to a high point in a fractional distillation zone at a substantially constant rate as feed and reflux, separating from said fractional distillation zone a relatively low-boiling fraction comprising a low-boiling hydrocarbon and substantially all of the hydrogen fluoride passed to said fractional distillation at a positively controlled substantially constant flow rate, separating from said fractional distillation a relatively high-boiling fraction substantially free from hydrogen fluoride, and maintaining a substantially constant pressure during said fractional distillation.

7. In the fractional distillation of a mixture containing a low-boiling hydrocarbon and hydrogen fluoride, the improvement which comprises passing such a mixture at a substantially constant rate to a fractional distillation, separating from said fractional distillation a relatively low-boiling fraction comprising a low-boiling hydrocarbon and substantially all of the hydrogen fluoride passed to said fractional distillation at a positively controlled substantially constant flow rate, separating from said fractional distillation a relatively high-boiling fraction substantially free from hydrogen fluoride, and maintaining a substantially constant pressure during said fractional distillation.

8. The process of claim 7 in which said relatively low-boiling fraction is about 10 per cent by volume of said mixture entering said fractional distillation.

9. In the fractional distillation of a mixture containing a low-boiling hydrocarbon and hydrogen fluoride in which the composition of said mixture is subject to variation, the improvement which comprises passing such a mixture to a high point in a fractional distillation zone at a substantially constant rate as feed and reflux, separating from said fractional distillation zone a relatively low-boiling fraction comprising a low-boiling hydrocarbon and substantially all of the hydrogen fluoride passed to said fractional distillation at a substantially constant rate, separating from said fractional distillation a relatively high-boiling fraction substantially free from hydrogen fluoride, and maintaining a substantially constant pressure during said frictional distillation.

10. In the distillation of a mixture containing a low-boiling hydrocarbon and hydrogen fluoride in which the composition of said mixture is subject to variation, the improvement which comprises passing such a mixture at a substantially constant rate to a distillation, separating from said distillation a relatively low-boiling fraction comprising a low-boiling hydrocarbon and substantially all of the hydrogen fluoride passed to said distillation at a substantially constant rate, separating from said distillation a relatively high-boiling fraction substantially free from hydrogen fluoride, and maintaining a substantially constant pressure during said distillation.

11. In the fractional distillation of a mixture containing isobutane and hydrogen fluoride in which the composition of said mixture is subject to variation, the improvement which comprises passing such a mixture at a substantially constant rate to a fractional distillation, separating from said fractional distillation a relatively low-boiling fraction comprising isobutane and substantially all of the hydrogen fluoride passed to said fractional distillation at a substantially constant rate, separating from said fractional distillation a relatively high-boiling fraction substantially free from hydrogen fluoride, and maintaining a substantially constant pressure during said fractional distillation.

12. The process of claim 11 in which said relatively low-boiling fraction is about 10 per cent by volume of said mixture entering said fractional distillation.

ROY E. VINYARD.

REFERENCES CITED

The following references are of record in the file of this patent:

UNITED STATES PATENTS

| Number | Name | Date |
|---|---|---|
| 2,322,800 | Frey | June 29, 1943 |
| 2,086,808 | Kallam | July 13, 1937 |
| 1,930,166 | Gard | Oct. 10, 1933 |
| 1,942,446 | Peterkin | Jan. 9, 1934 |
| 1,940,802 | Kallam | Dec. 26, 1933 |
| 2,086,808 | Kallam | July 13, 1937 |
| 2,109,201 | Ragatz | Feb. 22, 1938 |
| 2,301,520 | Carney | Nov. 10, 1942 |
| 2,342,166 | Plummer | Feb. 22, 1944 |
| 2,347,317 | Gibson | Apr. 25, 1944 |
| 2,320,629 | Matuszak | June 1, 1943 |
| 2,372,338 | Penisten | Mar. 27, 1945 |

FOREIGN PATENTS

| Number | Country | Date |
|---|---|---|
| 530,323 | French | Sept. 30, 1921 |

OTHER REFERENCES

Robinson and Gilliland, "Elements of Fractional Distillation," third edition, published 1939 by McGraw-Hill Book Co., Inc., New York, N. Y., pages 249 to 252.

"Continental Plant in the Refiner," vol 21, Jan. 1942, pages 51–56 and 58.

Robinson et al., "Elements of Fractional Distillation," 1939, third edition, McGraw-Hill, pp. 249–252. (Copy in Div. 25.)